April 23, 1957  R. L. MERRILL ET AL  2,789,761
CUMULATIVE SUMMING SYSTEM
Filed May 1, 1952  4 Sheets-Sheet 4

INVENTORS.
Roger L. Merrill
William Hecox
BY
ATTORNEYS.

United States Patent Office 2,789,761
Patented Apr. 23, 1957

2,789,761

CUMULATIVE SUMMING SYSTEM

Roger L. Merrill and William Hecox, Columbus, Ohio, assignors, by mesne assignments, to The Exact Weight Scale Company, Columbus, Ohio, a corporation of Ohio Application May 1, 1952, Serial No. 285,583

2 Claims. (Cl. 235—61)

Our invention relates to a cumulative summing system. It has to do, more particularly, with a system that determines the sum of a plurality of voltages that may exist at different times. This system will indicate the sum of a group or series of voltages applied in time succession from the beginning of such group or series to the time such indication takes place. Each such voltage, which comprises an input voltage to this system, can constitute a measure of a particular variable characteristic, for example weight, in an object or article being checked in regard to such characteristic. The sum of such voltages may be translated into energy which can be used as a control factor in obtaining the desired characteristic in subsequent objects or articles being checked.

The cumulative summing system of this invention has many applications. Since the sum of a given number of voltages is directly proportional to the average of such voltages, this summing system is particularly suitable for use as a summing means in the averaging system disclosed in our co-pending application, Serial No. 218,123 now Patent No. 2,688,459. It is capable of many other uses, however. In general, it may be used to average or sum a series of values of any desirable characteristic translatable into voltage, and, if desired, its output may be used in the control of such characteristic.

Each input to the summing system might consist of a single voltage derived by any suitable means to provide a measure of a particular variable characteristic in more than one object or article, if desired, or such single input voltage might constitute a combined measure of more than one characteristic. If it is desired to apply more than one individual input voltage to the summing system at one time, and to isolate each individual voltage from the others, the individual input voltages may be applied substantially in parallel in accordance with one form of the invention. The individual voltages could all have the same polarity or some might be of opposite polarity to the other voltages.

This summing system provides progressively an output voltage proportional to the sum of the voltages applied to it from the beginning of any series. Such output voltage is continuously readable or usable to actuate a control unit. If desired, such output voltage may be used or read only at predetermined stages in a series but it is available for reading or use at any stage of the series. The system will handle any predetermined number of input voltages without complicating the circuit, and the number of input voltages to be summed can be varied by simple switching means.

A primary object of our invention, therefore, is to provide a cumulative summing system having the foregoing features and advantages, and other features and advantages that will be apparent from the following description.

Another object of our invention is to provide a method and electronic apparatus for obtaining the cumulative sum of a plurality of voltages by obtaining in time succession a series of input voltages, each for an equal effective time interval, and integrating the successive products of each of said input voltages multiplied by a constant dependent upon said effective time interval.

An additional object is to provide means for applying in time succession a series of groups of individual input voltages applied at substantially the same time in parallel, each individual voltage applied for an equal effective time interval, in a cumulative summing system having means for integrating the simultaneous and successive products of each of said individual input voltages multiplied by a constant dependent upon said effective time interval.

A further object is to provide means for applying in time succession a series of input voltages, each for an equal effective time interval, in combination with means for integrating the successive products of each of said input voltages multiplied by a constant dependent upon said effective time interval.

The device hereinafter described, and illustrated in the accompanying drawings, may be used to obtain the cumulative sum of a plurality of voltages applied in time succession, and thus accomplish the foregoing objects.

Figure 1:
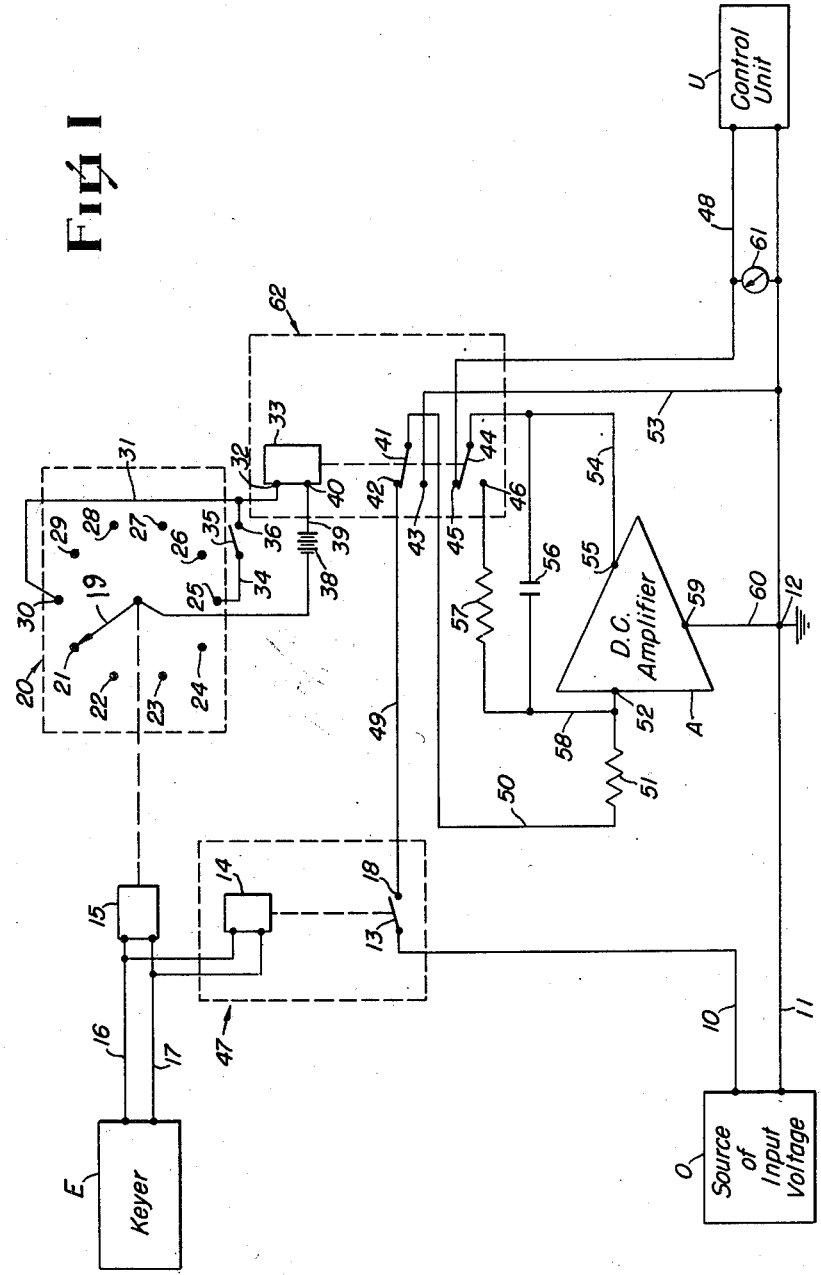
Figure 1 is a schematic view including a wiring diagram of a cumulative summing device according to this invention.

With reference to the drawings, Figure 1 illustrates a device that will obtain progressively the cumulative sum of either five or ten input voltages. It is to be understood, however, that the circuit can be varied in an obvious manner to obtain the sum of more than, or less than, five or ten voltages.

The circuit shown in Figure 1 comprises the input lines 10 and 11, through which voltage signals are introduced into this device. These voltage signals may constitute a measure of any variable characteristic translatable into voltage. For example, such voltage signals may be supplied by the oscillator and discriminator circuit 0 of the circuit of the weight-checking machine disclosed in the patent to Flannagan et al., No. 2,323,023 of June 29, 1943. The line 11 is grounded as is shown at 12, and the line 10 is connected to the contact 13 which is operatively connected with the relay coil 14. Another relay coil 15 is connected in parallel with the relay coil 14 and both these coils are energized through the lines 16 and 17 by the keyer E which may comprise any suitable means for energizing the relay coils 14 and 15. For example, the keyer E may comprise the electric eye or photoelectric system E of the circuit disclosed in copending application, Serial No. 218,123, now Patent No. 2,688,459.

The relay coil 14 controls the movable contact arm 13 which cooperates with a contact point 18. The relay coil 15 is operatively connected to and controls a movable contact arm 19 of a stepping switch which is indicated generally by the numeral 20. The movable contact arms 13 and 19 could be ganged so as to be controlled by a single relay coil, but for convenience they are shown here as controlled by separate relay coils 14 and 15, respectively. The stepping switch 20 is shown as including the ten contact points 21, 22, 23, 24, 25, 26, 27, 28, 29 and 30, which are uniformly angularly spaced, but the number may be varied if a different number of voltages is to be summed. All of these contact points are left floating except contact 30, which is connected by a line 31 to one terminal 32 of a relay coil 33. If it is desired to energize the relay coil 33 at every fifth step, rather than only at every tenth step of the stepping switch 20, the fifth contact point 25 may be connected by a line 34 to a switch contact arm 35, which may be manually operated to close against a contact point 36, which is connected to the line 31 which leads to the terminal 32 of relay coil 33. However, with the contact arm 35 in the position shown in Figure 1, the relay coil 33 will be energized at every tenth step of the stepping switch 20.

The movable contact arm 19 of the stepping switch 20 is connected through a line 37 to one terminal of a D. C. voltage source 38, which is schematically represented in Figure 1 as a battery. The other terminal of the D. C. voltage source 38 is connected through a line 39 to the other terminal 40 of the relay coil 33. The relay coil 33 is operatively connected to and controls a movable contact arm 41, which is disposed between contact points 42 and 43; and also is operatively connected to and controls a movable contact arm 44, which is disposed between the contact points 45 and 46. The movable contact arms 41 and 44 are so ganged that when the relay coil 33 is not energized the contact arm 41 is in engagement with contact point 42 and the contact arm 44 is in engagement with the contact point 45, as shown in Figure 1. However, when the relay coil 33 is energized, each of the contact arms 41 and 44 is moved to the opposite position from that shown in Figure 1, the contact arm 41 making contact with the point 43 and the contact arm 44 making contact with the point 46.

The contact point 42 is connected by a line 49 to the contact point 18 associated with the contact arm 13. The contact arm 41 is connected by a line 50 to one end of a resistance 51. The other end of the resistance 51 is connected to the input end 52 of high-gain direct-coupled amplifier A. The contact point 43 is connected by a line 53 to the grounded line 11. The amplifier A may be any suitable direct-coupled amplifier of conventional design. The contact arm 44 is connected by a line 54 to the output end 55 of the direct-coupled amplifier A, and to one side of a capacitor 56. The other side of this capacitor 56 is connected by a line 58 to the input ends 52 of the direct-coupled amplifier A. The contact point 46 is connected to one end of a resistance 57. The other end of the resistance 57 is connected to the line 58. The contact point 45 is connected to the output line 48. The ground terminal 59 of the amplifier A is connected by a line 60 to the grounded line 11, which is common to both the input and the output sides of the summing circuit.

If desired, a voltmeter 61 may be connected across the output lines 48 and 11. The voltage between the output lines 48 and 11 may be also supplied to control a unit U to which such lines may be connected. The control unit U may comprise any suitable means for controlling a factor affecting the variable characteristic which determines the input voltage to the lines 10 and 11. For example, the output voltage across the lines 48 and 11 may be used to control the action of the control unit U which will control the filler spout F associated with a weight-checking machine as disclosed in our copending application, Serial No. 218,123, now Patent No. 2,688,459.

The device of Figure 1 will operate as follows:

The source 0 applies an input voltage, which may be either a positive or a negative voltage, across the input lines 10 and 11. The keyer E energizes the relay coils 14 and 15 through the lines 16 and 17. The relay coil 14 moves the contact arm 13 to engage the contact point 18. The relay coil 14, the movable contact arm 13, and the contact point 18 comprises a time-delay relay, indicated generally by the numeral 47, of the type that closes when energized and remains closed for a fixed time interval. During the time that the contact arm 13 remains in contact with the point 18, input voltage is fed by the line 10 through the contact arm 13, the point 18 and the line 49 to the contact point 42.

From the contact point 42 the input voltage is conducted by the contact arm 41 and the line 50 to one side of the resistance 51. The input voltage is further connected through the resistance 51 to the input end 52 of the high-gain direct-coupled amplifier A. The voltage at the input end 52 of the high-gain direct-coupled amplifier A is amplified and fed back from the output end 55 of the amplifier A by the line 54 and the capacitor 56 to the input end 52, in opposition to the input voltage. Because of this negative feedback of the output from the amplifier A through the capacitor 56, the voltage at the input end 52, is maintained very close to the ground potential of the line 11 and the point 12. Since the output side of the capacitor 56 is connected through the contact arm 44 and the contact point 45 to the line 48, the voltage across the capacitor 56 appears across the output lines 48 and 11. This voltage may be measured by the voltmeter 61, if desired, and may be responded to by the control unit U.

While the foregoing operations are taking place, the relay coil 15, which is energized in parallel with the relay coil 14, causes the movable contact arm 19 of the stepping switch 20 to move from the first contact point 21 to the second contact point 22. At the expiration of the fixed time delay of the relay 47, the movable contact arm 13 disengages from the contact point 18 and the input voltage is removed from the remainder of the circuit. The next keying impulse from the keyer E energizes the relay coils 14 and 15, causing the same sequence of operations to take place for the next input voltage, and causing the movable contact arm 19 of the stepping switch 20 to move from the second contact point 22 to the third contact point 23. The operation continues similarly until the movable contact arm 19 of the stepping switch 20 contacts the point 30 (assuming the switch 35 is open as indicated).

When the contact arm 19 reaches the contact point 30, the circuit is completed from one side of the D. C. voltage source 38 through the line 37, the contact arm 19, the contact point 30, and the line 31, to the terminal 32 of the relay coil 33, and from the opposite terminal 40 of the relay coil 33 through the line 39 to the other side of the D. C. voltage source 38. Thus, the relay coil 33 is energized.

If it is desired to sum the input voltages in groups of five instead of groups of ten, the switch contact arm 35 may be closed to contact the point 36, in which event the relay coil 33 will also be energized when the movable contact arm 19 reaches the fifth contact point 25 of the stepping switch 20. The circuit then is completed from one side of the D. C. voltage source 38, through the line 37, the contact arm 19, the contact point 25, the line 34, the switch contact arm 35, the contact point 36, and the line 31, to the terminal 32 of the relay coil 33, and from the opposite terminal 40 of the relay coil 33, through the line 39, to the other side of the D. C. voltage source 38.

When the relay coil 33 is energized, the following action takes place: The contact arm 41 is moved from the position shown in Figure 1 to its lower position where it contacts the point 43, and the contact arm 44 is similarly simultaneously moved to contact the point 46. This action is delayed by the time-delay characteristics of the relay comprising the coil 33, the contact arms 41 and 44, and the associated contact points, and which is indicated generally by the numeral 62. Because of this time-delay action, the contact arms 41 and 44 are moved after the input voltage has been applied to and disconnected from the line 49 and the point 42 by the contact arm 13. When the contact arm 41 moves away from the point 42 to engage the point 43, the resistance 51 is disconnected from the input side of the circuit and is connected through the line 50, the contact arm 41, the point 43, and the line 53 to the grounded line 11. Thus, the input voltage to the high-gain direct-coupled amplifier A is zero. As the contact arm 44 simultaneously moves away from the contact 45 to engage the contact 46, the output voltage across the capacitor 56 is disconnected from the output line 48. At this time, the voltage across the capacitor 56 is discharged through the contact arm 44, the point 46, and the resistance 57.

The next impulse from the keyer E which energizes the relay coils 14 and 15 causes the contact arm 19 to move to the next floating contact point (21 or 26) breaking the circuit to the relay coil 33 and causing the relay coil 33 to become de-energized. The contact 41 then moves back to the contact point 42, and the contact arm 44 simultaneously moves back to the contact point 45. The relay coil 14 causes the movable contact arm 13 to connect with the point 18, and the entire sequence of operations begins anew.

It will be apparent that any other conventional hold circuit could be substituted for the time-delay relay 47 in applying the input voltage to the circuit for a fixed time interval, without departing from the spirit of the invention, since the function would be equivalent to that of the time-delay relay.

It will now be shown that at any stage of an operating sequence the output voltage across lines 48 and 11 is proportional to the sum of the input voltages applied up to that time during such sequence.

Because of the negative feedback through the capacitor 56 from the high-gain direct-coupled amplifier A, the voltage between the grounded line 11 and the input end 52 of the amplifier A is negligible in comparison with the input voltage across the lines 10 and 11. Therefore, the voltage across the resistance 51 is substantially equal to the input voltage across the lines 10 and 11, which is applied to the contact 42. The input voltage applied to the contact 42 will be designated $e_{in}$. For the same reason, the output voltage across the lines 48 and 11, which will be designated $e_{out}$, is substantially equal to the voltage across the capacitor 56.

Therefore, the following equations apply to the circuit of Figure 1:

$$i_{51} = \frac{e_{in}}{R_{51}} \quad (1)$$

$$i_{56} = C_{56} \frac{d}{dt} e_{out} \quad (2)$$

wherein $i_{51}$ is the current in amperes through the resistance 51, $R_{51}$ is the resistance in ohms of the resistance 51, $i_{56}$ is the current in amperes through the capacitance 56, and $C_{56}$ is the capacitance in farads of the capacitor 56. The operation of the conventional direct-coupled amplifier A is such that no current flows internally through the high-impedance input end 52 thereof. Therefore, the current through the resistance 51 must be equal to the current through the capacitor 56 and the following equations are applicable to the circuit:

$$C_{56} \frac{d}{dt} e_{out} = \frac{e_{in}}{R_{51}} \quad (3)$$

$$de_{out} = \frac{e_{in}}{R_{51}C_{56}} dt \quad (4)$$

$$e_{out} = \frac{1}{R_{51}C_{56}} \int e_{in} dt \quad (5)$$

Each input voltage remains substantially constant during the short time interval in which it is applied to the circuit. Since each input voltage is applied for an equal time interval, Equation 5 may be written in the following form:

$$e_{out} = Ke_{in_1} + Ke_{in_2} + Ke_{in_3} + \ldots + Ke_{in_n} \quad (6)$$

in which K is a constant dependent upon the time interval during which each input voltage is applied to the circuit and upon the constants of the circuit and in which $e_{in_1}$ through $e_{in_n}$ represent the individual input voltages applied during a sequence of operation. It is apparent from Equation 6 that the resistance 51, the amplifier A, and the capacitor 56 comprise an integrating circuit, providing an output voltage that integrates the successive products of each input voltage multiplied by a constant dependent upon the effective time interval during which each input voltage is applied.

Equation 6 may be rewritten in the following form:

$$e_{out} = K(e_{in_1} + e_{in_2} + e_{in_3} + \ldots + e_{in_n}) \quad (7)$$

It is apparent from Equation 7 that the output voltage is continuously proportional to the sum of the input voltages applied to the circuit from the beginning of a given sequence.

It is to be noted that the progressively accumulated output voltage may be used at any desired stage or stages in the operating sequence to actuate the control unit U. It is also to be noted that the cumulative summing system operates as described herein regardless of whether the input voltages are all of the same polarity or comprise input voltages that may have either positive or negative polarity. For example, if a series of five input voltages is applied, all of said input voltages being of the same polarity, as follows: 3, 1, 0, 2, and 1, the progressive output voltages are respectively proportional to the progressive sums 3, 4, 4, 6, and 7 of the input voltages, during the sequence. If, however, a series of five input voltages comprises voltages of opposite polarities, as follows: +1, −3, +2, +3, and −1, the progressive output voltages will be, respectively, the progressive algebraic sums +1, −2, 0, +3 and +2 of the input voltages, during the sequence.

Figure 2:
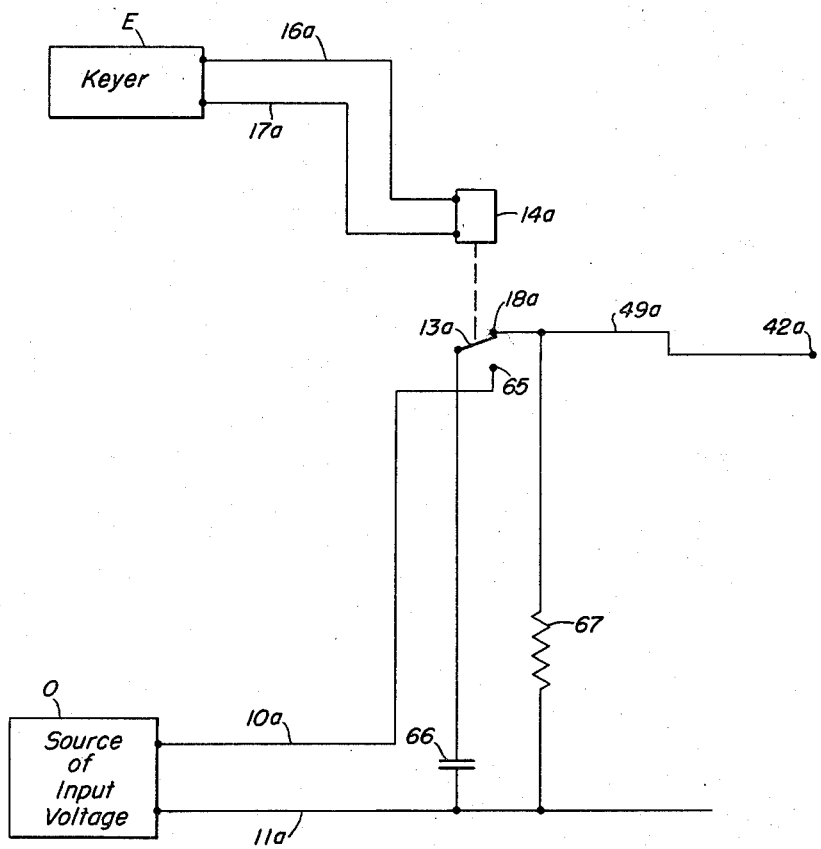
Figure 2 is a similar view showing a modification of the circuit of Figure 1.

Figure 2 illustrates a modification of the input portion of the circuit for applying input voltage to the cumulative summing system of Figure 1. The input portion of the circuit as shown in Figure 2 differs from the input portion of the circuit as shown in Figure 1 only in the following details: In Figure 2, the input line 10a is connected to a contact point 65 associated with the movable contact arm 13a. The movable contact arm 13a is connected to one side of a capacitor 66. The other side of the capacitor 66 is connected to the grounded line 11a. The line 49a which runs from the contact point 42a to the contact point 18a is connected to one side of a resistance 67. The other side of the resistance 67 is connected to the grounded line 11a. The keyer E is provided as before and connects to the relay coil 14a by the lines 16a and 17a. In the absence of an energizing impulse from the keyer E to the relay coil 14a, the contact arm 13a remains in contact with the point 18a.

The cumulative summing system of Figure 1, as modified in Figure 2, will operate as follows:

When the keyer E energizes the relay coil 14a, the movable contact arm 13a moves from the contact point 18a to the contact point 65. The input voltage is now connected through the line 10a, the contact point 65, and the contact arm 13a to one side of the capacitor 66, the other side of which is connected to the line 11a. The capacitor 66 is thus charged to the input voltage. After a brief time delay, the contact arm 13a moves back to its normal unenergized position, contacting point 18a. The voltage across the capacitor 66 is now applied through the contact arm 13a, the contact point 18a, and the line 49a to the contact point 42a, corresponding to the same point where the input voltage is applied in the circuit of Figure 1.

The voltage across the capacitor 66 does not remain constant, but decreases exponentially as the capacitor 66 discharges through the resistance 67. The next energizing impulse from keyer E energizes the relay coil 14a causing the contact arm 13a to move to engage the contact point 65, charging the capacitor 66 with the next input voltage, and the process continues as described for the first input voltage. The stepping switch 20, and all of the other associated components in the integrating portion of the circuit of Figure 1 operate in the same manner as was described for the circuit in Figure 1.

It will be observed from Figure 2 that each input voltage across the lines 10a and 11a is first applied to the capacitor 66, is then transferred from the capacitor 66 to the point 42a, and decreases exponentially as the capacitor 66 discharges through the resistance 67. Since the circuit through the capacitor 66, the contact arm 13a, the contact point 18a and the resistance 67 has a definite time constant, it is apparent that each input voltage is thus applied to the contact point 42a for an equal effective time interval.

Instead of the square wave impulse applied for a fixed time interval to the point 42 in the circuit of Figure 1, in the circuit of Figure 2 there is applied to the point 42a a voltage impulse decreasing exponentially. The integral of this exponential impulse, however, is directly proportional to the input voltage received from the lines 10a and 11a because the rate of decay determined by the time constant of the RC circuit of resistance 67 and capacitor 66 is the same for all input voltages. Hence, the Equations 1 through 7 presented above as applied to the circuit of Figure 1, apply also to the circuit of Figure 2, although the proportionality constant K is different for each of the two circuits. This fact does not substantially affect the operation of the cumulative summing system, however, because the system is easily calibrated either in terms of input voltage or in terms of the variable characteristic to be measured or controlled, and the proportionality constant K, as used in the foregoing equations, is only one factor affecting such calibration.

Although the circuit of Figure 2 is suitable for most purposes, it may be desirable, where input voltages are to be applied in very rapid succession, to provide an input circuit in which one input voltage can be applied to a capacitor for subsequent summing, at the same time that another capacitor is applying an input voltage, previously received, to the integrating circuit of the cumulative summing system. Such an input circuit is provided in the circuit of Figure 3.

Figure 3:
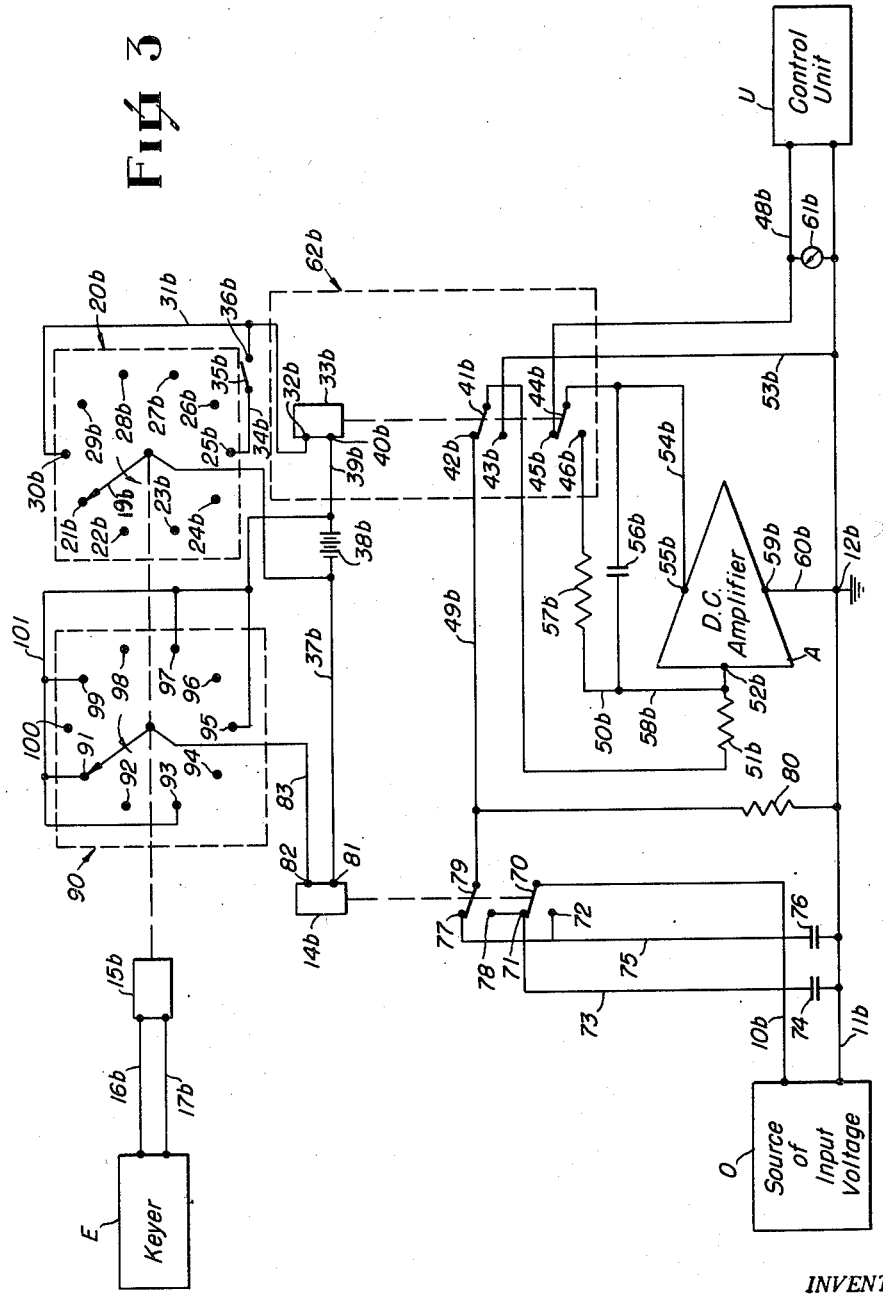
Figure 3 is a wiring diagram of another modification of the cumulative summing device designed for faster operation than that normally obtained with the device of Figure 2.

In the circuit of Figure 3, the source of input voltage 0 applies input voltage across the input lines 10b and 11b. The line 11b is grounded, as illustrated at 12b. The line 10b is connected to a movable contact arm 70, which is disposed between the contact points 71 and 72. The contact point 71 is connected by a line 73 to one side of a capacitor 74; the other side of the capacitor 74 being connected to the grounded line 11b. The contact point 72 is connected by a line 75 to one side of a capacitor 76; the other side of the capacitor 76 being connected to the grounded line 11b. The line 75 also connects the contact point 72 to a contact point 77. The line 73 also connects the contact point 71 to a contact point 78.

Associated with the contact points 77 and 78 is a movable contact arm 79, which is connected by the line 49b to the contact point 42b. The line 49b also connects the contact arm 79 and the contact point 42b to one end of a resistance 80. The other end of the resistance 80 is connected to the grounded line 11b. The contact arms 70 and 79 are both controlled by the relay coil 14b. When the relay coil 14b is energized, the movable arms 70 and 79 are in the positions shown in Figure 3, the contact arm 70 engaging the contact point 71 and the contact arm 79 engaging the contact point 77. When the relay coil 14b is not energized, the contact arm 70 moves down to engage contact point 72, and the contact arm 79 moves down to engage the contact point 78.

One side of the D. C. voltage source 38b, represented schematically in Figure 3 as a battery, is connected by the line 37b to the terminal 81 of the relay coil 14b.

The opposite terminal 82 of the relay coil 14b is connected by a line 83 to a movable contact arm 84 of a stepping switch which is indicated generally by the numeral 90. The stepping switch 90 comprises, in addition to the movable contact arm 84, the ten contact points 91, 92, 93, 94, 95, 96, 97, 98, 99 and 100. Five of the contact points, namely, 91, 93, 95, 97 and 99 are connected by a line 101 to the other side of the D. C. voltage source 38b. The remaining five contact points 92, 94, 96, 98 and 100 are left floating.

The stepping switch 90 is ganged to the stepping switch 20b so that movable arms 19b and 84 are always at corresponding points, where the contact point 21b corresponds to the contact point 91, the contact point 22b corresponds to the contact point 92, and so on. The relay coil 15b, which may be energized by the keyer E through the lines 16b and 17b, controls the stepping switches 20b and 90, simultaneously. The stepping switch 20b and the stepping switch 90 may be combined, if desired, to comprise a single stepping switch of the two-deck type now commonly in use.

The stepping switch 20b, as before, includes, in addition to movable contact arm 19b, the ten contact points 21b, 22b, 23b, 24b, 25b, 26b, 27b, 28b, 29b and 30b. All of these contact points are left floating except the contact point 30b, which is connected by the line 31b to the terminal 32b of the relay coil 33b. If it is desired to energize the relay coil 33b at every fifth step, rather than at every tenth step, the contact 25b may be connected by the line 34b to the switch contact arm 35b, which may be manually operated to close against the contact point 36b, which is connected through line 31b to the terminal 32b of the relay coil 33b.

It is to be noted that the stepping switch 20b could be replaced in the circuit of Figure 3 and in the circuit of Figure 1 by a counter switch of the type that closes its contacts on every fifth electrical or mechanical impulse, every tenth impulse, or in any other desired manner. Other equivalent devices, including electronic switching means, could also be used in place of the stepping switch 20b. Similarly, the stepping switch 90 could be replaced by any equivalent device, such as a simple single-pole-single-throw switch of the type that makes contact, then breaks, makes, breaks, and so on, as each electrical or mechanical impulse is applied.

The movable contact arm 19b of the stepping switch 20b is connected through the line 37b to one terminal of the D. C. voltage source 38b. The other terminal of the D. C. voltage source 38b is connected through the line 39b to the terminal 40b of the relay coil 33b. The relay coil 33b controls the movable contact arm 41b, which is disposed between the contact points 42b and 43b, and controls the movable contact arm 44b, which is disposed between the contact points 45b and 46b. The movable contact arms 41b and 44b are ganged so that when the relay coil 33b is not energized, contact arm 41b is in engagement with the contact point 42b and the contact arm 44b is connected to the contact point 45b, as shown in Figure 3. When the relay coil 33b is energized, each of the contact arms 41b and 44b moves to the opposite position from that shown in Figure 3, the contact arm 41b making contact with the point 43b, and the arm 44b making contact with the point 46b.

The contact 42b is connected by the line 49b to the contact arm 79, associated with the contact points 77 and 78. The contact arm 41b is connected by the line 50b to one end of the resistance 51b. The other end of the resistance 51b is connected to the input end 52b of the high-gain direct-coupled amplifier A. The contact point 43b is connected by the line 53b to the grounded line 11b. The amplifier A may be any suitable direct-coupled amplifier of conventional design. The contact arm 44b is connected by the line 54b to the output end 55b of the direct-coupled amplifier A, and to one side of the capacitor 56b. The other side of the capacitor 56b is connected by the line 58b to the input end 52b of the amplifier A. The contact point 46b is connected to one end of the resistance 57b. The other end of the resistance 57b is connected to the line 58b. The contact point 45b is connected to the output line 48b. The ground terminal 59b of the amplifier A is connected by the line 60b to the grounded line 11b, which is common to both the input and the output sides of the summing device. If desired, the voltmeter 61b may be connected across the output lines 48b and 11b. The voltage between the output lines 48b and line 11b may also be connected to any suitable control unit U.

The device of Figure 3 will operate as follows:

The source 0 applies an input voltage, which may be either a positive or a negative voltage, across the input lines 10b and 11b. The line 11b is connected to one side of the capacitor 74 and the line 10b is connected to the contact arm 70, which engages the contact point 71 connected by the line 73 to the other side of the capacitor 74. At this stage of operation all contact arms are in the positions shown in Figure 3. The input voltage from the source 0 appears across the capacitor 74. The keyer E energizes the relay coil 15b through the lines 16b and 17b causing the contact arm 19b of the stepping switch 20b to move from the first contact point 21b to the next contact point 22b, and causing contact arm 84 of stepping switch 90 to move from the first contact point 91 to the second contact point 92.

While the contact arm 84 engages the contact point 91, the relay coil 14b is energized. The energizing circuit is completed from one side of the D. C. voltage source 38b, through the line 37b to the terminal 81 of the relay coil 14b, then from the opposite terminal 82 of the relay coil 14b, through the line 83, the contact arm 84, the contact point 91, and the line 101 to the other side of the D. C. voltage source 38b. With relay coil 14b energized, the contact arm 79 engages the contact point 77 and the contact arm 70 engages the point 71, as shown in Figure 3. When the contact arm 84 of the stepping switch 90 moves to the floating contact 92, however, the energizing circuit through the relay coil 14b is broken and the relay coil 14b becomes de-energized.

When the relay coil 14b is de-energized, the contact arm 79 moves from the contact point 77 down to the contact point 78, and the contact arm 70 moves from the contact point 71 down to the contact point 72. The contact arm 70 and the contact arm 79 are ganged and both are controlled by the relay coil 14b. With the contact arm 70 contacting the point 72, the input voltage is disconnected from the capacitor 74, and is now connected across the capacitor 76, which has a capacitance equal to that of the capacitor 74. The grounded side of the input voltage is fed to one side of the capacitor 76 by the line 11b and the other side of the input voltage is connected by the line 10b, the contact arm 70, the point 72, and the line 75 to the other side of the capacitor 76. With the contact arm 79 engaging the contact point 78, the capacitor 74, charged to the previously applied input voltage, is connected by the line 73, the contact point 78, the contact arm 79 and the line 49b to the contact point 42b.

From the contact point 42b, this voltage is conducted by the contact arm 41b and the line 50b to one end of the resistance 51b. The voltage is further conducted through the resistance 51b to the input end 52b of the high-gain direct-coupled amplifier A. The voltage at the input end 52b of the high-gain direct-coupled amplifier A is amplified and fed back from the output end 55b of the amplifier A by the line 54b and capacitor 56b to the input end 52b, in opposition to the input voltage. Because of this negative feedback of the output voltage from the amplifier A through the capacitor 56b, the voltage at the input end, point 52b, is maintained very close to the ground potential of line 11b and point 12b. Since the output side of the capacitor 56b is connected through the contact arm 44b and the contact point 45b to the line 48b, the voltage across the capacitor 56b appears across the output lines 48b and 11b. This voltage may be measured by the voltmeter 61b, if desired, and may be responded to by the control unit U.

The voltage applied from the capacitor 74 to the contact point 42b is discharged through the line 49b and the resistance 80 to the grounded line 11b. Since the circuit of the capacitor 74 and the resistance 80 has a definite time constant, the effective time during which the voltage from the capacitor 74 is applied to the contact point 42b is fixed.

The next energizing impulse from the keyer E to the relay coil 15b causes the contact arm 19b of the stepping switch 20b to move from the second contact point 22b to the third contact point 23b and causes the contact arm 84 of stepping switch 90 to move from the second contact point 92 to the third contact point 93, completing the energizing circuit through the relay coil 14b.

The contact arms 70 and 79 return to the positions shown in Figure 3. The input voltage is disconnected from the capacitor 76, and is now applied through the line 10b, the arm 70, the contact point 71, and the line 73 to the capacitor 74, which has just been discharged through the resistance 80, but is now disconnected from the resistance 80 and the contact point 42b. A voltage equal to the preceding input voltage, which has been applied to the capacitor 76, is now connected from the capacitor 76 to the contact 77 and through the arm 79 and the line 49b to the contact point 42b, and the operation continues in the same manner as described above.

The voltage from the capacitor 76 discharges through the line 49b and the resistance 80 and since the capacitance of the capacitor 76 is equal to that of the capacitor 74, the time constant of the discharging circuit, comprising the capacitor 76 and the resistance 80, is the same as the time constant of the discharging circuit, comprising the capacitor 74 and the resistance 80 in the preceding stage of the operating sequence. The effective time interval during which the input voltage previously applied to the capacitor 76 is applied from capacitor 76 to the contact point 42b, is the same as the effective time interval during which the preceding input voltage was applied from the capacitor 74 to the contact point 42b. Therefore, the integrating action of the amplifier and feedback circuit is the same as that described for the circuits of Figure 1 and Figure 2, and the output voltage across lines 48b and 11b provides, progressively, a measure of the sum of the input voltages applied during a given series.

The sequence of operations just described is repeated, with alternate application of input voltage to each capacitor during application of the voltage across the other capacitor to the integrating circuit, as described. Contact arms 19b and 84 move one step apiece simultaneously, with each application of input voltage until the contact arm 19b of the stepping switch 20b reaches the tenth contact point 30b and the contact arm 84 of stepping switch 90 reaches the tenth contact point 100.

When the contact arm 19b of the stepping switch 20b reaches the contact point 30b, the circuit is completed from one side of the D. C. voltage source 38b, through the line 37b, the contact arm 19b, the contact point 30b, and the line 31b, to the terminal 32b of the relay coil 33b, and from the opposite terminal 40b of the relay coil 33b, through the line 39b, to the other side of the D. C. voltage source 38b. Thus, the relay coil 33b is energized.

If desired, the switch contact arm 35b may be closed to contact point 36b, in which event the relay coil 33b will also be energized when the movable contact arm 19b reaches the contact point 25b of the stepping switch 20b. The contact arm 84 of stepping switch 90 is then at the fifth contact point 95. The circuit is then completed from one side of the D. C. voltage source 38b, through the line 37b, the contact arm 19b, the contact point 25b, the line 34b, the switch contact arm 35b, the contact point 36b, and the line 31b, to the terminal 32b of the relay coil 33b, and from the opposite terminal 40b of the relay coil 33b, through the line 39b, to the other side of the D. C. voltage source 38b.

When the relay coil 33b is energized, the following action takes place. The contact arm 41b is moved from the position in Figure 3 to its lower position contacting the point 43b, and contact arm 44b is similarly moved to contact the point 46b. This action is delayed by the time-delay characteristics of the relay comprising the coil 33b, the contact arms 41b and 44b, and the associated contact points, and indicated generally by the numeral 62b. Because of this time-delay action, the contact arms 41b and 44b are moved after the voltage applied to the contact point 42b has discharged through the resistance 80. When the contact arm 41b moves away from the point 42b to engage the point 43b, the resistance 51b is disconnected from the input side of the circuit and is connected through the line 50b, the contact arm 41b, the contact point 43b, and the line 53b to grounded line 11b. Thus, the input voltage to the high-gain, direct-coupled amplifier A is zero. As the contact arm 44b simultaneously moves away from the contact point 45b to engage the contact point 46b, the output voltage across the capacitor 56b is disconnected from the output line 48b. At this time, the voltage across the capacitor 56b is discharged through the contact arm 44b, the point 46b, and the resistance 57b.

The next impulse from the keyer E, energizing the relay coil 15b, causes the contact arm 19b of the stepping switch 20b to move to a floating contact point (21b or 26b), breaking the circuit to the relay coil 33b and causing the relay coil 33b to become de-energized. The contact arm 41b then moves back to the contact point 42b, and the contact arm 44b simultaneously moves back to the contact point 45b. Meanwhile, the contact arm 84 of stepping switch 90 moves to the next contact point (91 or 96), the capacitor (74 or 76) bearing the charge from the last input voltage, is connected to the contact point 42b, the present input voltage is connected to the other capacitor, and the entire sequence of operations begins anew.

It will be apparent that the input circuit could be modified in an obvious manner, to include additional capacitors and, if desired, additional resistances, and that switching means could be added to permit operation from more than one source of input voltages. It would be necessary, of course, that each combination of capacitor and resistance for discharging the capacitor have the same time constant.

It will be observed that the integrating action of the circuit in Figure 3 is identical to that of the circuit of Figure 2. Hence, the Equations 1 through 7 presented above as applied to the circuit of Figure 1 and the circuit of Figure 2, apply also to the circuit of Figure 3. Therefore, at any stage of an operating sequence, the output voltage across the output lines 48b and 11b in the circuit of Figure 3 is proportional to the sum of the input voltages applied up to that time during such sequence, just as in the circuits of Figure 1 and Figure 2.

Figure 4:
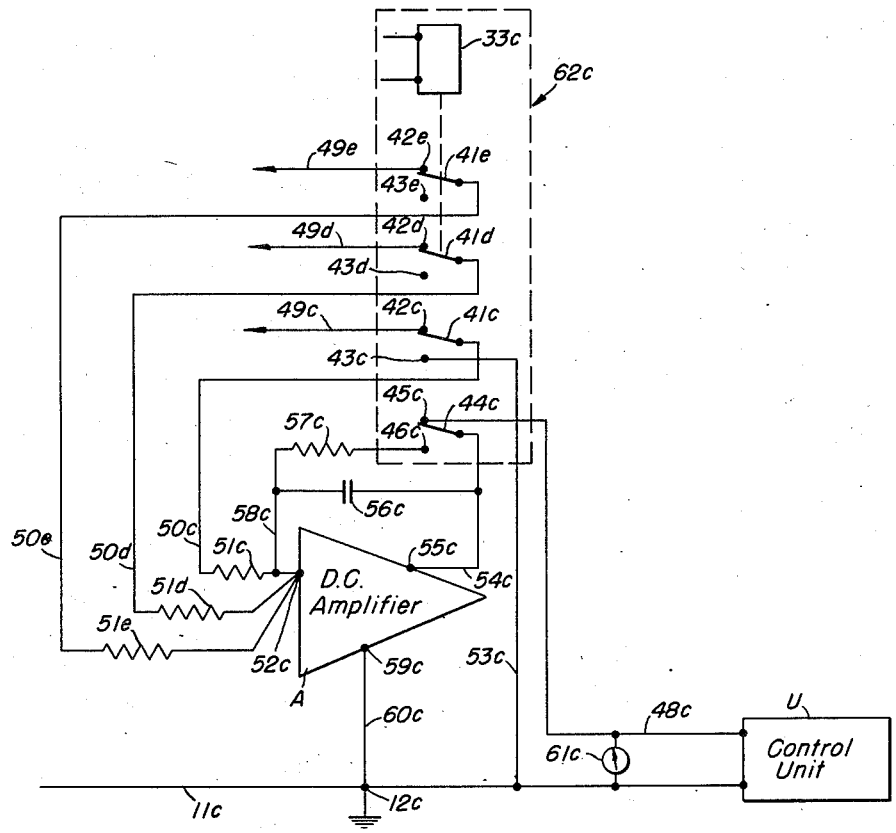
Figure 4 is a wiring diagram illustrating a modification of the integrating section of the cumulative summing device permitting the simultaneous application of a plurality of input voltages in parallel.

In some applications of our invention it may be desired to obtain the sum of two or more individual voltages that are present at the same time and to accumulate such totals applied in time succession over an operating sequence. This can be done by connecting the individual voltages in series to comprise a single input voltage to the input lines 10 and 11 of Figure 1, 10a and 11a of Figure 2, or 10b and 11b of Figure 3. A series connection would not be practicable in all situations, however, since the individual voltages might interact, and since individual voltages having a common ground could not be connected in series. If it is necessary or desirable to isolate the individual input voltages from each other, such voltages may be applied to the integrating circuit in parallel, as is shown in Figure 4. Individual voltages having a common ground can be used. Each individual input voltage may be applied to a separate input circuit, which could be the input circuit of Figure 1, the input circuit of Figure 2, or the input circuit of Figure 3. By "input circuit" is meant the circuit connecting the source of input voltage 0 to the contact point 42, the contact point 42a, or the contact point 42b; such as the line 10, the relay coil 14, the contact arm 13, the contact point 18, and the line 49 of Figure 1. Each individual voltage should, of course, be applied by the same type of input circuit, and for the same effective time interval.

Figure 4 shows means for receiving three individual input voltages simultaneously, but it will be apparent that a larger or smaller number of voltages could readily be applied in like manner with obvious additions to, or deletions from, the circuit shown in Figure 4.

In Figure 4, the line 49c receives one of the individual input voltages, connecting it through a contact point 42c, a contact arm 41c, and a line 50c, to one end of a resistance 51c, the other end of which is connected to the input end 52c of a direct-coupled amplifier A. A second input voltage is fed to the line 49d which connects this input voltage through a contact point 42d, a contact arm 41d, and a line 50d, to one end of a resistance 51d, the other end of which is connected to the input end 52c of the direct-coupled amplifier A. In like manner, a third input voltage is connected to the input end 52c of the amplifier A through a line 49e, a contact point 42e, a contact arm 41e, a line 50e, and a resistance 51e. Each of the resistances 51c, 51d, and 51e should be of equal magnitude.

The time-delay relay indicated generally by the designation 62c comprises all of the elements enclosed in the rectangle 62c. The relay coil 33c thereof is connected to a stepping switch in the same manner as the relay coil 33 of Figure 1 and the relay coil 33b of Figure 3 are connected. The relay coil 33c actuates the contact arms 41e, 41d, 41c, and 44c. The contact point 43c is connected by a line 53c to the line 11c, which is grounded, as is indicated, at the point 12c. The contact points 43d and 43e of the relay are left floating. The ground terminal 59c of the amplifier A is connected to the grounded line 11c by a line 60c. The output terminal 55c of the amplifier A is connected by a line 54c to a contact arm 44c of the relay and to one side of a capacitor 56c; the other side of the capacitor 56c being connected by a line 58c to the input end 52c of the direct-coupled amplifier A. The contact arm 44c, while making contact with the point 45c, as shown in Figure 4, connects the output of the direct-coupled amplifier A to an output line 48c. A control unit U may be connected across the output line 48c and the grounded line 11c. A voltmeter 61c may be connected also across the output line 48c and the grounded line 11c. A contact point 46c of the relay is connected to one end of a resistance 57c, the other end of which is connected to the line 58c.

The operation of the circuit in Figure 4 is the same as the operation of the circuit of Figure 1, Figure 2, or Figure 3, depending on which type of input is used, except that in each step of the operation of the circuit of Figure 4, three individual input voltages are applied, instead of only one.

It will be observed that, although the individual input voltages are applied to the input end 52c of the direct-coupled amplifier A in parallel, the input voltage on each line 49c, 49d, 49e is isolated from the other input voltages by the resistances 51c, 51d, 51e, respectively, which are of sufficient magnitude to prevent any possible interaction of one input voltage upon another. Furthermore, if inputs of the type shown in Figure 2, or the type shown in Figure 3, are used rather than inputs of the type shown in Figure 1, the sources of input voltage are completely isolated from each other since they are never connected to the input lines 49c, 49d, 49e. The voltages at the input end 52c of the direct-coupled amplifier A are amplified and fed back through the capacitor 56c as in the other forms of the invention.

The relay coil 33c is normally de-energized, and all of the contact arms of relay 62c are in the upper position as shown in Figure 4. At any predetermined stage, such as every fifth step, or every tenth step, as in the other forms of our invention, the relay coil 33c may be energized to terminate the sequence and start a new sequence. If this is done at every fifth step, fifteen input voltages are accumulated; if it is done at every tenth step, thirty input voltages are accumulated.

When the relay coil 33c becomes energized, all of the contact arms thereof are moved to the downward position, after the time delay which is required to permit each input voltage to be integrated. The contact arm 44c moves down to the contact point 46c, disconnecting the output of the amplifier A from the output line 48c, and discharging the capacitor 56c through the resistance 57c. At the same time, the contact arm 41c moves away from the contact point 42c, disconnecting the input line 49c from the resistance 51c, and contacts the point 43c, connecting the resistance 51c through the line 50c, the arm 41c, the contact point 43c, and the line 53c to the grounded line 11c. Similarly, the resistance 51b is disconnected from its input line 49d and the contact point 42d, as the contact arm 41d moves down to the floating contact 43d. At the same time, the contact arm 41e moves down to the floating contact point 43e, breaking the circuit from the input line 49e and the contact point 42e. At this time, the input to D. C. amplifier A is therefore zero. The relay coil 33c is de-energized when the next group of input voltages is applied, and a new sequence begins.

It will now be shown that at any stage of an operating sequence, the output voltage across the lines 48c and 11c of Figure 4 is proportional to the sum of all of the individual input voltages applied up to that time during such sequence.

Because of the negative feedback through the capacitor 56c from the high-gain, direct-coupled amplifier A, the voltage between the grounded line 11c and the input end 52c of amplifier A is negligible in comparison with the input voltages between the grounded line 11c and the lines 49c, 49d, and 49e, respectively. The voltage across the resistance 51c, therefore, is substantially equal to the input voltage across the lines 49c and 11c; the voltage across resistance 51d is substantially equal to the input voltage across the lines 49d and 11c; and the voltage across the resistance 51e is substantially equal to the input voltage across the lines 49e and 11c. These individual input voltages will, therefore, be called $e_{51c}$, $e_{51d}$, and $e_{51e}$, respectively. For the same reason, the output across the lines 48c and 11c, which will be called $e_{out}$, is substantially equal to the voltage across the capacitor 56c.

Therefore, the following equations apply to the circuit of Figure 4:

$$i_{51c} = \frac{e_{51c}}{R_{51c}} \quad (8)$$

$$i_{51d} = \frac{e_{51d}}{R_{51d}} \quad (9)$$

$$i_{51e} = \frac{e_{51e}}{R_{51e}} \quad (10)$$

$$i_{56c} = C_{56c}\frac{d}{dt}e_{out} \quad (11)$$

wherein $i_{51c}$, $i_{51d}$, $i_{51e}$, and $i_{56c}$, are the respective currents in amperes through the resistances 51c, 51d, and 51e, and the capacitor 56c; $R_{51c}$, $R_{51d}$, and $R_{51e}$ are the respective resistances in ohms of the resistors 51c, 51d, and 51e; and $C_{56c}$ is the capacitance in farads of the capacitor 56c. The operation of the conventional direct-coupled amplifier A is such that no current flows internally through the high-impedance input end 52c. Therefore, the currents flowing into the point 52c through the resistances 51c, 51d, and 51e must be equal to the current flowing away from the point 52c through the capacitor 56c, and the following equations are applicable to the circuit:

$$i_{51c} + i_{51d} + i_{51e} = i_{56c} \quad (12)$$

$$C_{56c}\frac{d}{dt}e_{out} = \frac{e_{51c}}{R_{51c}} + \frac{e_{51d}}{R_{51d}} + \frac{e_{51e}}{R_{51e}} \quad (13)$$

$$de_{out} = \left(\frac{e_{51c}}{R_{51c}C_{56c}} + \frac{e_{51d}}{R_{51d}C_{56c}} + \frac{e_{51e}}{R_{51e}C_{56c}}\right)dt \quad (14)$$

$$e_{out} = \frac{1}{R_{51c}C_{56c}}\int e_{51c}dt + \frac{1}{R_{51d}C_{56c}}\int e_{51d}dt + \frac{1}{R_{51e}C_{56c}}\int e_{51e}dt$$

With each input voltage applied for an equal effective time interval in accordance with the invention as described in connection with Figures 1, 2, and 3, and with the resistances of the resistors 51c, 51d, and 51e all equal, Equation 15 may be written in the following form:

$$e_{out} = K\{e_{51c(1)} + e_{51c(2)} + e_{51c(3)} + \ldots + e_{51c(n)} +$$

$$e_{51d(1)} + e_{51d(2)} + e_{51d(3)} + \ldots + e_{51d(n)} +$$

$$e_{51e(1)} + e_{51e(2)} + e_{51e(3)} + \ldots + e_{51e(n)}\} \quad (16)$$

in which K is a constant dependent upon the effective time interval during which each individual input voltage is applied to the circuit and upon the constants of the circuit.

$$e_{51c(1)}$$

through $$e_{51c(n)}$$

represent the individual input voltages applied to resistance 51c during a sequence of operation;

$$e_{51d(1)}$$

through $$e_{51d(n)}$$

represent the individual input voltages applied during a sequence of operation to the resistance 51d; and $$e_{51e(1)}$$

through $$e_{51e(n)}$$

represent the individual input voltages applied during a sequence of operation to the resistance 51e.

It is apparent from Equation 16 that the output voltage is continuously proportional to the sum of the individual input voltages applied to the circuit from the beginning of a given sequence. It is also apparent from Equation 16 that the resistances 51c, 51d and 51e, the amplifier A, and the capacitor 56c, comprise an integrating circuit, providing an output voltage that integrates the products of each individual input voltage multiplied by a constant depending upon the effective time interval during which each individual input voltage is applied. This integration of the individual input voltages takes place during each application of input voltages, and these simultaneous integrations are themselves successively integrated during each sequence of operation.

It is to be noted that a larger or smaller number of individual input voltages could be applied during each step of a sequence, and that equations similar to Equations 8 through 16 could be written for any finite number of individual input voltages to show that the output voltage at any stage of the sequence is proportional to the sum of all of the individual input voltages applied up to that time during the sequence. Since Equations 8 through 16 show that no specific time relationship need exist between the individual input voltages, it is not necessary for them to be applied simultaneously. So, although a primary purpose of the circuit of Figure 4 is to permit the application of a plurality of voltages at the same time, its operation is not limited to the simultaneous application of the individual input voltages.

As in the other forms of our invention, the individual input voltages may be all of the same polarity, in which event the simultaneous and successive integrating actions of the circuit provide at any stage of a sequence an output voltage proportional to the sum of all of the individual input voltages applied; or some of the individual input voltages may have the polarity opposite to that of the other individual input voltages, in which event such output voltage will be proportional to the algebraic sum of such individual input voltages.

It will be apparent from the above that we have provided a cumulative summing system that determines the sum of a plurality of voltages that may exist at different times. Our system will indicate the sum of a group or series of voltages applied in time succession from the beginning of such group or series to the time such indication takes place. Each such voltage can constitute a measure of a particular variable characteristic in an object or article being checked in regard to such characteristic. The sum of such voltages may be translated into energy which can be used as a control factor in obtaining the desired characteristic in subsequent objects or articles being checked.

Having thus described our invention, what we claim is:

1. A cumulative summing system for use with a source of discrete voltages sequentially delivered, said system including in combination: an integrator having an input for receiving electrical charges; and a voltage-receiving and charge-delivering circuit for passing a predetermined number of voltages to be integrated, comprising a resistance connected between said integrator input and a terminal common to both the voltage source and the integrator input; first switching means interposed between the integrater input and said voltage source; a switch actuator controlling said switching means and responsive to each arrival of a voltage from said source; two substantially identical capacitors connected between said common terminal and different terminals on said first switching means, said latter means when actuated alternately connecting one capacitor to said source to receive and build up a charge proportional to the level of the then existing source voltage, and connecting the other capacitor across said integrator input and said resistance to form with the latter a fixed time constant, said other capacitor delivering to said integrator input during an interval predetermined and made uniform by said time constant the electrical charge built up by and proportional to the immediately preceding source voltage; and second switching means controlled by said switch actuator and counting the number of source voltages delivered, said second switching means discharging the integrator and resetting said summing system to zero after the integration of said predetermined number of voltages from said source.

2. A cumulative summing system for use with a source of discrete voltages sequentially delivered, said system including in combination: an integrator having an input for receiving electrical charges; and a voltage-receiving and charge-delivering circuit for passing a predetermined number of voltages to be integrated comprising a resistance connected between said integrator input and a terminal common to both the voltage source and the integrator input; first switching means interposed between the integrator input and said voltage source; a switch actuator controlling said switching means and responsive to each arrival of a voltage from said source; a capacitor connected between said common terminal and said switching means, said latter means when actuated connecting said capacitor alternately to said source to receive and build up a charge proportional to the level of a voltage from said source, and then connecting said capacitor across said integrator input and said resistance to form with the latter a fixed time constant, said capacitor then delivering its charge to said integrator input during an interval predetermined and made uniform by said time constant; and second switching means controlled by said switch actuator and counting the number of source voltages delivered, said second switching means discharging the integrator and resetting said summing system to zero after the integration of said predetermined number of voltages from said source.

References Cited in the file of this patent
UNITED STATES PATENTS

| | | |
|---|---|---|
| 2,412,227 | Och et al. | Dec. 10, 1946 |
| 2,474,074 | Sunstein | June 21, 1949 |
| 2,496,338 | Barton | Feb. 7, 1950 |
| 2,511,197 | Darlington et al. | June 13, 1950 |
| 2,551,964 | Norton | May 8, 1951 |
| 2,568,914 | Faudell | Sept. 25, 1951 |
| 2,607,528 | McWhirter et al. | Aug. 19, 1952 |

OTHER REFERENCES

A Simple Analogue Computer for Fourier Analysis and Synthesis (Bowen and Burnup), Electronic Engineering, February 1951, pages 67 to 69.

"Design of D. C. Electronic Integrators" by G. A. Korn, "Electronics" May 1948; pages 124–126.